United States Patent [19]

Tsikos et al.

[11] Patent Number: 5,013,927
[45] Date of Patent: May 7, 1991

[54] OBJECT LOCATION APPARATUS

[75] Inventors: Constantine J. Tsikos, West Berlin; Jerome P. Rosenfeld, Collingswood Township, Camden County, both of N.J.

[73] Assignee: General Electric Company, Moorestown, N.J.

[21] Appl. No.: 515,834

[22] Filed: Apr. 27, 1990

[51] Int. Cl.⁵ .............................. G01N 21/86
[52] U.S. Cl. ............................ 250/561; 250/560; 356/376
[58] Field of Search ............... 250/560, 561, 223; 901/7, 47; 356/376, 386, 400

[56] References Cited

U.S. PATENT DOCUMENTS

| | | | |
|---|---|---|---|
| 4,063,820 | 12/1977 | Borgese . | |
| 4,105,925 | 8/1978 | Rossol et al. | 356/376 |
| 4,705,081 | 11/1987 | Birk et al. | 901/47 |
| 4,803,371 | 2/1989 | Durland . | |
| 4,926,917 | 5/1990 | Kirbach | 250/560 |
| 4,929,843 | 5/1990 | Chmielewski, Jr. et al. | 250/561 |

Primary Examiner—David C. Nelms
Assistant Examiner—Que Tan Le
Attorney, Agent, or Firm—William H. Meise

[57] ABSTRACT

A translucent support, which may be the support surface of an article conveyor, supports objects, locations or dimensions of which are to be determined. A point light source or light sources severally illuminate the surface and object thereupon. An imaging apparatus located below the translucent surface generates signals representing the images of the illuminated translucent surface and the shadows generated by the object thereon. The signals for two or more illumination conditions are processed to determine the locations of at least portions of the object. A particular avatar of the invention uses a conveyor with translucent web.

17 Claims, 5 Drawing Sheets

OBJECT LOCATION APPARATUS

The Government has rights in this invention pursuant to contract No. 104230-84-D-0929 with the Post Office.

BACKGROUND OF THE INVENTION

Modern production systems require automation for handling objects, as for moving work pieces from one part of a factory to another, for feeding work pieces into a machine for manufacturing operations and for removing the resulting processed workpieces, for packing finished products and the like. In many contexts, the objects are identical, whereby specialized sorting, orientation and gripping devices may be used. In some contexts, the sequence involves objects which are not identical. For example, certain automobile manufacturers currently have production lines in which different models alternate, or in which different models may be randomly placed along the production line. For such situations, object identification and location schemes are necessary.

Among the more difficult problems in article sorting and processing are identification of the size and shape of the object, and identification of its location. U.S. Pat. No. 4,063,820 issued Dec. 20, 1977 to Borgese describes a tilted conveyor belt in which parcels gravitate to particular locations on the belt, together with a system of narrow light beams which are broken by the edges of the advancing parcel. In the Borgese arrangement, breaking a light beam causes the signal generated by the associated photosensor to change. Since the locations of the phototransmitter which generates each light beam and its associated photosensor are known, geometrical relationships may be used to determine the dimensions of the parcel, and its location may also be determined because the speed of the conveyor belt is fixed. Once the size and shape of the object are determined, and its location is established, a gripper may be used to grasp it and to place the object for further processing. The Borgese arrangement requires movement of the object to break the various light beams.

In the context of determining the size, shape and location of elongated objects such as in the cutting of boards from logs, U.S. Pat. No. 4,803,371 issued Feb. 7, 1989 to Durland describes a scheme in which the boards are supported by a conveyor at locations spaced along their lengths, and are simultaneously illuminated from above and below by scans of light. Cameras placed above and below the boards view the boards, discriminate the light, and process the resulting image signals to generate signals representative of the dimensions of the board. This arrangement suffers from the disadvantages that objects of arbitrary size and shape cannot be conveyed and processed in a similar manner, and that the light must be scanned. An object location scheme usable for randomly sized objects is desired, in which relative motion of the object and light is not mandatory.

SUMMARY OF THE INVENTION

An apparatus according to the invention includes a translucent or diffusing support surface, which may be fixed or which may be a part of a conveyor, which surface is illuminated by at least first and second nondiffuse light or other radiation sources. Each source causes an opaque object located on the support surface to cast a shadow onto the translucent surface. The translucent surface is viewed from below by an imager or camera to form signals representative of the images of illuminated and shadowed portions of the support surface. The signals are processed to determine a dimension or a location of at least a portion of the object In a particular avatar or embodiment of the invention, a diffuse light source may be used to cast a shadow showing an outline of the object.

DESCRIPTION OF THE DRAWING

FIGS. 3a, 3b and 3c are jointly referred to as FIG. 3;

DESCRIPTION OF THE INVENTION

Figure 1:
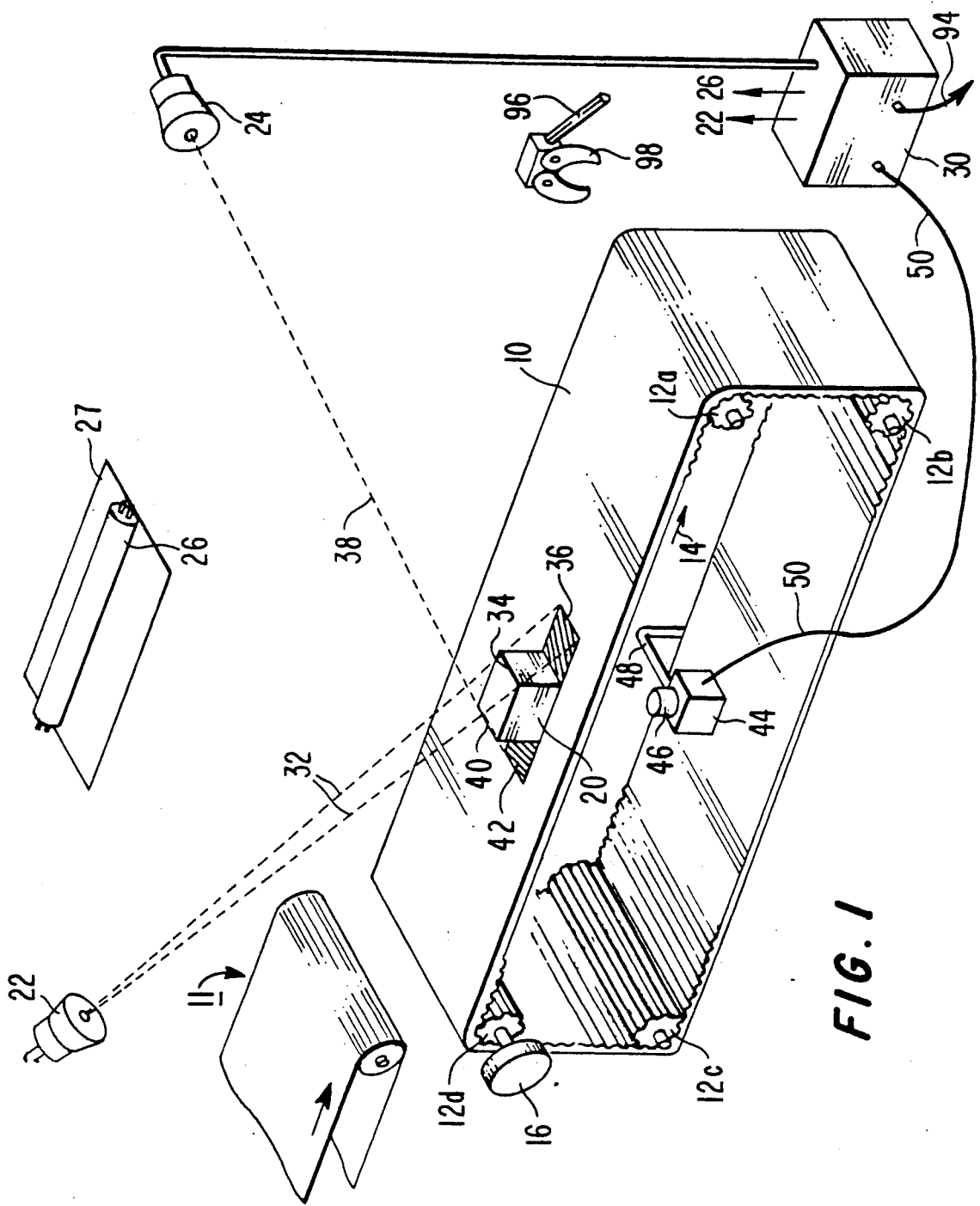
FIG. 1 is a perspective or isometric view of a translucent conveyor belt for conveying objects, together with diffuse and nondiffuse light sources, an imaging apparatus, and a control and processing arrangement.

FIG. 1 is a perspective or isometric view of an avatar of the invention for determining the location of at least a portion of an object. In FIG. 1, an endless conveyor belt 10 is translucent to visible light. Conveyor belt 10 is supported by four toothed drive cylinders 12a, 12b, 12c and 12d. The conveyor belt 10 is driven in the direction of arrow 14 by a motor 16 mechanically coupled to drive cylinder 12d. Conveyor belt 10 may be made from clear acrylic material which has been rendered translucent by roughening or etching of the surface. A feed conveyor apparatus designated generally as 11 dumps unsorted, random-size objects such as parcels onto the left end of conveyor belt 10. The objects travel to the right side of the conveyor, where they may be picked up by a gripper, illustrated as 98, carried on a robot arm 96.

As illustrated in FIG. 1, an object having a shape illustrated as a parallelepiped 20 is supported by the upper side of conveyor belt 10 and is transported in the direction of arrow 14. A first non-diffuse light source 22 is placed at a known location above the plane in which the upper portion of conveyor belt 10 lies. A similar non-diffuse light source 24 is placed at another location separated from the location of light source 22. Light sources 22 and 24 may be point light sources such as arc lamps or small lamps approximating a point source, or they may be scanned laser sources, all as known in the art. A diffuse light source illustrated as a fluorescent lamp 26 together with a planar diffuser 27 is located generally above conveyor belt 10 to illuminate the region of conveyor belt 10 in which objects are to be located. Light sources 22, 24 and 26 are coupled to a control arrangement illustrated as block 30. As described below, block 30 controls the energization of light sources 22, 24 and 26, and also processes certain signals.

When light source 22 is energized and sources 24 and 26 are deenergized, source 22 illuminates the upper side of conveyor belt 10. Certain rays, illustrated as 32, extend between point source 22 and an edge 34 of object 20. The projection of rays 32 onto translucent surface 10 defines the limits of a shadow, a portion which is illustrated as 36, and the remainder of which extends under object 20 Similarly, when light source 22 is deenergized, but point light source 24 is energized, the surface of conveyor belt 10 and object 20 are illuminated. Certain light rays illustrated as 38 extend from point source 24 past a further edge 40 of object 20. The projection of rays 38 onto the upper side of conveyor belt 10 define the limits of a further shadow illustrated as 42, the remainder of which extends under object 20. When diffuse light source 26, 27 is energized and point light sources 22 and 24 are deenergized, the entire upper side of conveyor belt 10 is illuminated, except for a shadowed portion lying directly under object 20.

A television camera illustrated as 44 is located between the upper and lower portions of conveyor 10, and includes a lens arrangement 46 for viewing the underside of the upper portion of conveyor belt 10. Camera 44 is supported by a cantilever arrangement 48. Camera 44 is energized and controlled from control arrangement 30 over a multiconductor cable 50, which also provides a data path by which signals representative of images may be coupled back to control arrangement 30.

In operation, conveyor 11 dumps objects onto conveyor 10, which carries them to the region over camera 44. Control block 30 alternately energizes sources 22, 24 and 26, to cast different shadow patterns onto translucent conveyor 10. Camera 44 views the images of illuminated and shadowed regions of conveyor belt 10 under the various conditions of illumination, to generate signals representative of the images, from which information the locations of at least portions of objects placed on conveyor belt 10 may be determined by triangulation and other calculations based upon the known locations of the sources and conveyor. It is assumed herein that the conveyor speed is slow enough so that the processing of data for location of the object is essentially instantaneous, so that the object is essentially stationary during the measurement. If this should not be the case, the conveyor may be stopped or slowed during computation so that the location of each portion of the object may be more accurately determined. The signals representative of the position, size, etc. of the object are sent over a data path 94 to a utilization device (not illustrated) which may for example be associated with a controller for robot arm 98 and gripper 98, for grasping the object and for moving it to another location.

It should particularly be noted that the invention is particularly well adapted for identifying dimensions of objects supported on a stationary support, corresponding to the condition in FIG. 1 in which conveyor belt 10 is a translucent tabletop. The principles of the invention are the same for a stationary or essentially stationary object.

Figure 2A:
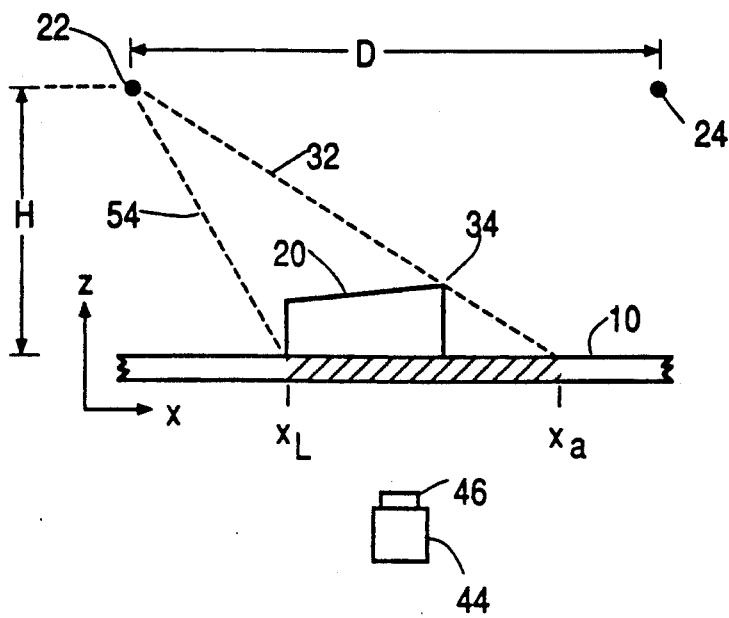
FIGS. 2a and 2b, referred to jointly as FIG. 2, are schematic representations of illumination of an object by the sources of FIG. 1 under various conditions of energization.

FIG. 2a is a simplified side or elevation view of a portion of the arrangement of FIG. 1, illustrating geometrical considerations which may be taken into account in processing shadow information in accordance with the invention. Elements of FIG. 2 corresponding to those of FIG. 1 are designated by the same reference numerals. As illustrated in FIG. 2a, source 22 is at a height H in the z direction above the upper surface of conveyor belt 10, and sources 22 and 24 are at the same height and spaced D apart in the x direction. Camera 44 is aligned with the physical coordinate system, as described below. The camera's position, optics and scan format together establish a simple linear relationship between the camera's image coordinates (i,j) and the physical coordinates (x,y) of the shadow-images or the translucent surfaces. In FIG. 2a, source 22 is energized and source 24 is deenergized. Source 22 produces light, portions of which are illustrated by rays 32 and 54.

As illustrated in FIG. 2a, ray 32 grazes edge 34 of object 20, and casts a shadow which ends at a point $x_a$. The shadow extends from $x_a$ to the left and under object 20, to the intersection at position $x_L$ of ray 54 with the bottom left corner of object 20.

Figure 2B:
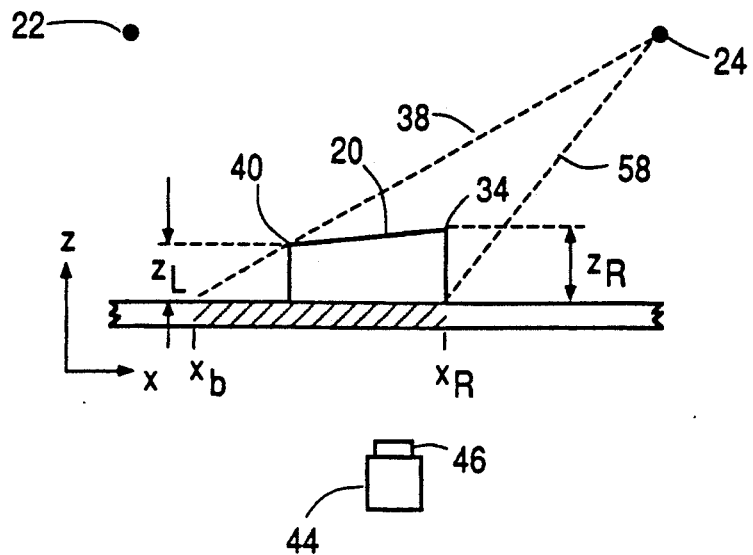

FIG. 2b is similar to FIG. 2a, but with source 24 energized and source 22d energized. Object 20 casts a shadow delimited by the projection of ray 38 grazing edge 40, and extending to intersect conveyor 10 at position $x_b$. The shadow extends to the right from $x_b$, under object 10, to the intersection at position $x_r$ of ray 58 with the lower right corner of object 40.

As illustrated in FIG. 2a, when light source 22 is energized, the left x-coordinate $x_l$ can be determined directly from the left-most dark area which is imaged. The position of the shadow cast by the right edge at location $x_a$ is stored in the form of data. When source 22 is deenergized and source 24 is energized, as illustrated in FIG. 2b, the position of the lower right edge of object 20 is directly determined as being at $x_r$. The shadow position $x_b$ is noted. The z positions of edges 34 and 40 can also be determined from this information. The height $z_L$ of left edge 40 and $z_R$ of right edge 34 are determined, respectively, as $$z_L = H(x_a - x_R)/((D/2) + x_a) \qquad (1)$$

$$z_R = H(x_b - x_L)/((D/2) + x_b) \qquad (2)$$

where sources 22 and 24 are located above x-positions —D/2 and +D/2, respectively.

The physical coordinates (x, y) of points on translucent surface 10 corresponding to points of interest (i,j) in the camera image can be determined by $$y = a_1 * i + b_1$$

$$x = a_2 * j + b_2$$

where the * represents multiplication, and where $a_1$, $a_2$, $b_1$, $b_2$ are the linear parameters of the camera imaging system as determined by simple geometrical relations from the known camera position, optics, and scanning parameters. Such geometrical representations are very simple to implement in a processor, and may readily be extended to objects with more complicated geometries and positioning.

Figure 3A:
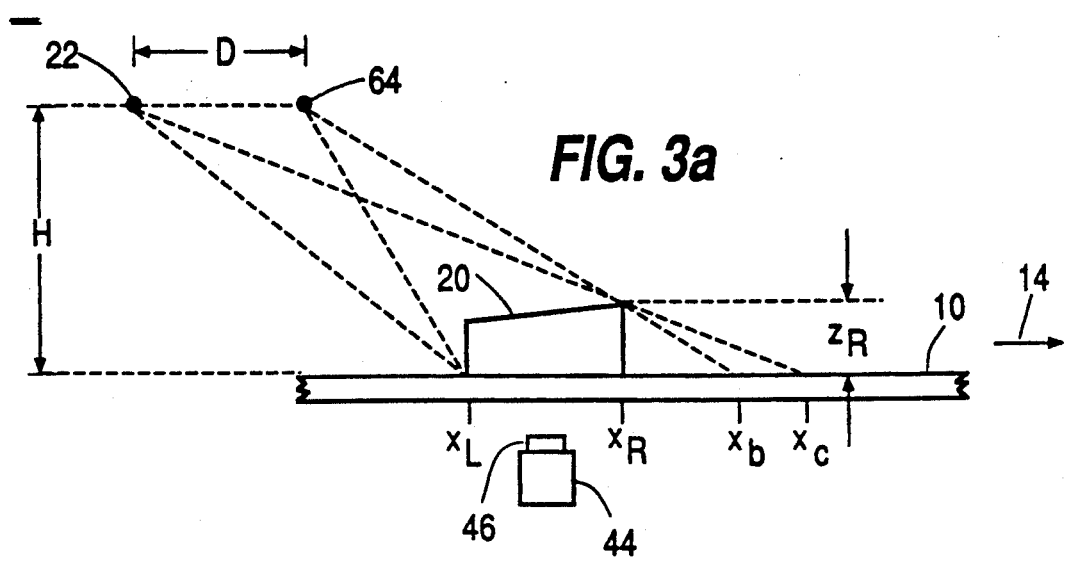
FIG. 3a illustrates illumination of an object by a pair of sources arrayed in different locations than those of FIGS. 1 and 2, and FIGS. 3b and 3c illustrate the shadows seen from below under two different illumination conditions.

FIG. 3a is similar to FIG. 2a, and corresponding elements are designated by the same reference numerals. FIG. 3a illustrates point sources 22 and 64 spaced H above the upper surface of conveyor belt 10 and spaced D apart, but unlike FIG. 2a, object 20 does not lie between the light sources. Object 20 is at a location which is downstream, in the direction of arrow 14, relative to sources 22 and 64. In this figure, xa is the shadow edge generated by light source 22, xb is the shadow edge generated by light source 64, and xR and zR are the unknown right shadow edge and height. If the x-axis origin is located under light source 22, the solutions for these unknowns are $$xR = D(xa)/(D + xa - xb) \quad (3)$$

$$zR = H(xa - xR) xa \quad (4)$$

Figure 3B:
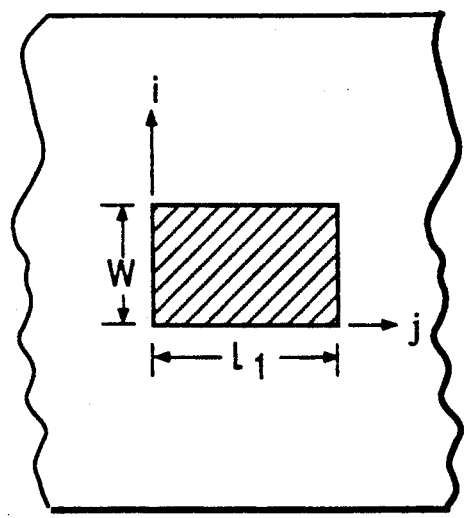
Figure 3C:
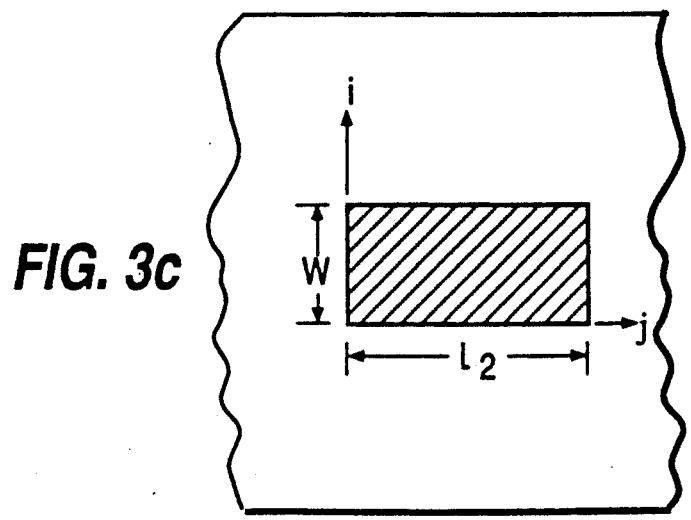

FIG. 3b illustrates a shadow image having width in the i direction and length in the j direction, which represents the image seen by camera 44 in FIG. 3a when light source 64 is energized and light source 22 is deenergized. The vertical i axis is at right angles to or crosses the camera scan lines, and the j axis is parallel to the scan lines, so the i axis may be considered to be the scan line number axis, and the j axis is the time index or sample number along a scan line. FIG. 3c illustrates the image of the corresponding shadow cast when source 22 is energized and source 64 deenergized. As illustrated in FIG. 3c, the shadow has width W and length $L_2$.

Figure 4:
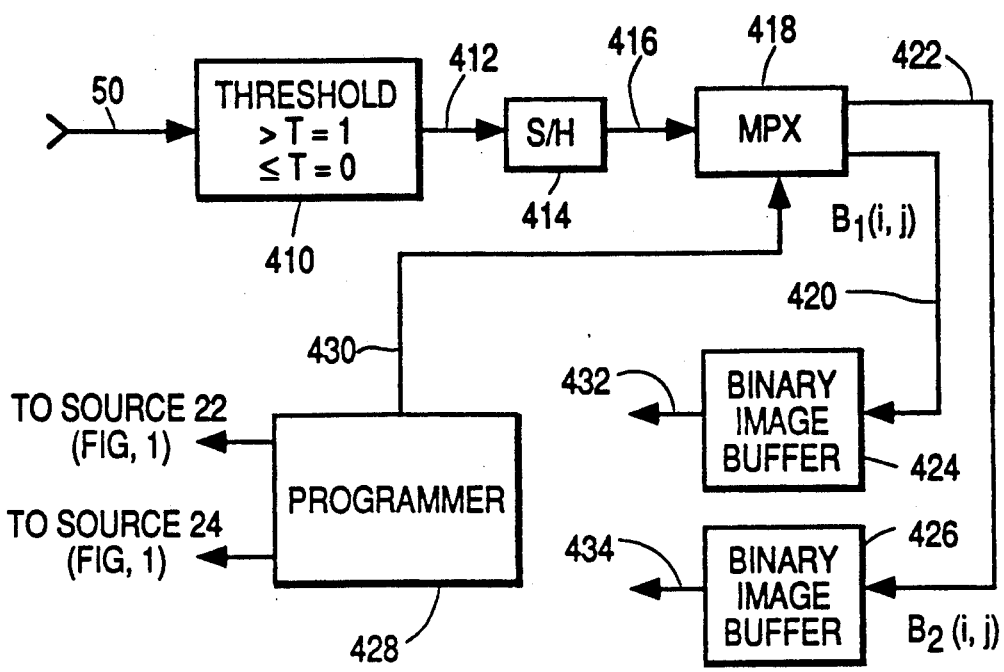
FIG. 4 is a simplified block diagram of a processing arrangement for signals representing the images of FIGS. 3b and 3c.

FIG. 4 illustrates a block diagram of equipment associated with control circuit 30 for processing signals representative of the images of FIGS. 3b and 3c. Elements of FIG. 4 corresponding to those of FIG. 1 are designated by the same reference numerals. In FIG. 4, cable 50 carries scanned image information to a threshold circuit illustrated as a block 410. Threshold circuit 410 generates a binary (two-level) signal representative of the presence or absence of shadow along the camera scan line (j) direction. The binary signal is coupled by way of a data path 412 to a clocked sample-and-hold (S/H) circuit 414, which breaks the information into discrete samples. The samples are applied over a data path 416 to a multiplex (MPX) circuit illustrated as a block 418.

Multiplex circuit 418 is controlled by way of signals applied from a programmer illustrated as a block 428. Programmer 428 also controls the energization of sources 22 and 24 of FIG. 1. When source 22 is energized, a particular shadow pattern is generated, which may be similar to that of FIG. 3b. The camera image is converted to binary form in blocks 410 and 414 of FIG. 4, and MPX circuit 418 is controlled to couple the resulting signals $B_1(i,j)$ to a binary image buffer 424. Buffer 424 stores the frame of signals representing the shadows created by energization of source 22. When this is completed, programmer 428 deenergizes source 22 and energizes source 24, thereby creating a second shadow pattern, such as that of FIG. 3c. At the same time, programmer 428 switches multiplex circuit 418 to couple the resulting binary signals $B_2(i,j)$ to a binary image buffer 426, where they are stored. The stored shadow images are available on read data paths 432 and 434 for further processing to determine object dimensions.

Figure 6A:
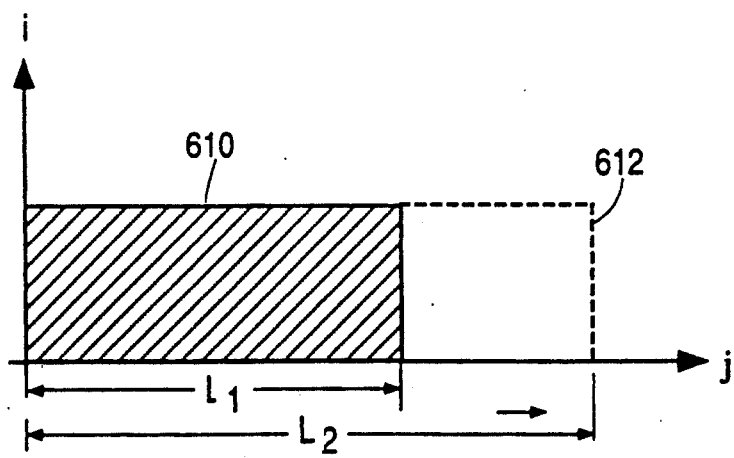
FIGS. 6a and 6b illustrate conceptual steps of signal processing.
Figure 6B:
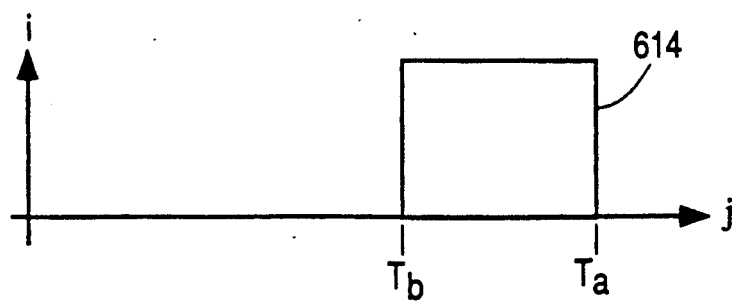
Figure 5:
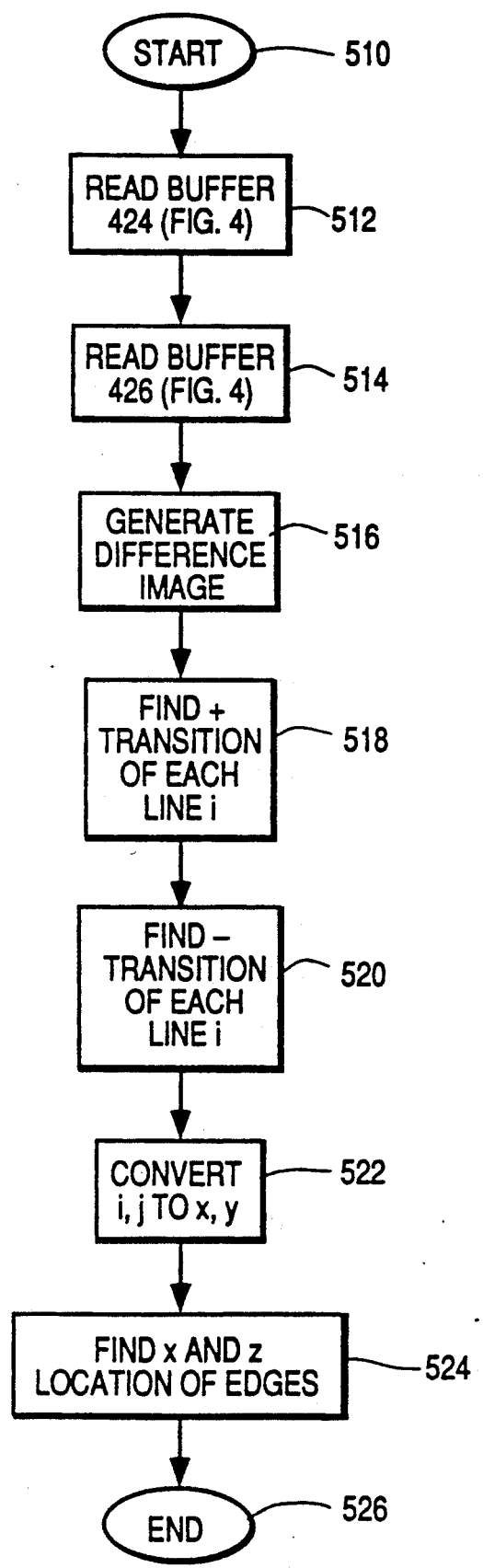
FIG. 5 is a simplified flow chart illustrating processing for determining the unknown location and height of the right edge of the object in FIG. 3.

FIG. 5 is a flow chart of the processing used with the arrangement shown in FIG. 3 to determine the height and location of the right-most edges of objects. In FIG. 5, the logic flow starts at a START block 510 and proceeds to a cascade of blocks 512, 514 and 516, which together represent the formation of a difference (Δ) image. FIG. 6a represents as 610 the shadow produced during energization of source 22, as imaged by camera 44 and placed in binary form by the arrangement of FIG. 5. Dash-line 612 represents the corresponding shadow during energization of source 24. FIG. 6b represents the difference between the shadows represented by the signals stored in buffers 424 and 426 of FIG. 4. In particular, block 512 represents reading of buffer 424 to access information relating to shadow 610 of FIG. 6a, block 514 represents reading of buffer 426 to access information relating to shadow 612 of FIG. 6a, and block 516 represents the equivalent of an exclusive-or (EXOR) operation performed on the stream of data if
$B1(i,j) \neq B2(i,j), D(i,j) = 1$ \quad (5)
else
$D(i,j) = 0$ \quad (6)

which conceptually generates the difference image 614 of FIG. 6b.

Block 518 represents location of the first positive-going transition of each scan j of the Δ image of FIG. 6b, which for each scan line defines a location Tb. Similarly, block 520 represents location of the first negative-going transition, which for each scan line defines a location Ta. As illustrated in FIG. 6, the shadows are such that all scan lines have the same value of Ta and Tb, but this is not necessary to the invention.

Block 522 represents conversion of Ta and Tb in the i, j coordinate to physical coordinates x, y, $$x_b(i) = a_2 * T_b(i) + b_2 \quad (7)$$

$$x_a(i) = a_2 * T_a(i) + b_2 \quad (8)$$

Block 524 represents calculation of the x- and z- locations of the edges of the object $$x_R(i) = D * x_a(i)/(D + x_a(i) - x_b(i)) \quad (9)$$
$$z_R(i) = (H * (x_a(i) - x_R(i))/x_a(i) \quad (10)$$

Other embodiments of the invention will be apparent to those skilled in the art. In particular, light sources having different spectral distributions may be used in conjunction with cameras sensitive to the different components, so that the object may be illuminated simultaneously by several sources to cast shadows having different spectral compositions, to thereby obviate the delay attributable to sequential energization of the light sources. While visible light sources have been described, electromagnetic radiation which does not lie in the visible light band may be used either alone or in conjunction with visible light, so long as the support surface is translucent to at least some of the radiation or light. Fixed translucent support surfaces such as tables may be used where appropriate, rather than the described movable conveyor surface. While sources such as 64 of FIG. 3a have been described as point sources, they are point sources only in the projection of the FIGURE, and may therefore be line sources extending perpendicular to the plane of the FIGURE. A location of a single edge may be identified by the use of a one-dimensional single line scan camera, if desired.

What is claimed is:

1. An apparatus adapted for receiving an object and for determining the location of at least one portion of the object, said apparatus comprising:
    a support surface including first and second sides, and adapted for supporting objects on said first side of said surface;
    at least non-diffuse first and second sources of electromagnetic radiation, the wavelength of which is selected so that said support surface is translucent thereto and said object is expected to be opaque thereto, said first and second sources being located at predetermined first and second separate positions, spaced away from and directing radiation toward said first side of said surface, whereby, if an object is present on said support surface, at least one shadow of said object is cast upon said surface by said object;

imaging means spaced away from said second side of said support surface for viewing said second side and for generating image signals representing illuminated and shadowed portions of said second side of said support surface;

memory means for storing memory signals representative of at least the relative locations of said first and second sources, said support surface and said imaging means; and signal processing means coupled to said imaging means and to said memory means for processing said image signals and said memory signals and for generating signals representative of the location of at least one portion of an object located on said support surface.

2. An apparatus according to claim 1, wherein said memory means is a preprogrammed ROM.

3. An apparatus according to claim 1, wherein said support surface is flat.

4. An apparatus according to claim 1, wherein said support surface is associated with conveyor means.

5. An apparatus according to claim 1, wherein said signal processing means further comprises control means coupled to said first and second sources for energizing said sources as part of a sequence for thereby illuminating at least one of said objects which may be on said support surface in said sequence, whereby shadows are cast differently during said sequence.

6. An apparatus according to claim 5, wherein said signal processing means further comprises image memory means coupled to said imaging means for separately storing, during at least a portion of said sequence, information relative to the images of said shadows.

7. An apparatus according to claim 6 wherein said image memory means stores information relating to the image of least one said shadow during a step of said sequence in which said first source is energized, and separately stores information relating to the image of at least one said shadow during a step of said sequence in which said second source is energized.

8. An apparatus according to claim 6 wherein said signal processing means further comprises differencing means coupled to said image memory means for taking the difference between at least some portions of said separately stored information.

9. An apparatus according to claim 8 wherein said signal processing means further comprises counting means coupled to said differencing means for determining a dimension of at least one said difference.

10. An apparatus according to claim 1 wherein said non-diffuse source is a point source.

11. An apparatus according to claim 1, wherein said sources are sources of visible light, and said support surface is translucent, whereby ordinary objects such as parcels are opaque.

12. An apparatus according to claim 10 further comprising a diffuse light source spaced away from said first side of said support surface for illuminating said first surface and any object located thereupon, whereby an outline shadow of said object appears on said second side of said support surface.

13. A method for determining the location of at least one portion of an object, comprising the steps of:
placing said object on a translucent surface;
illuminating said object by means of a non-diffuse light source placed at a known first location spaced away from the side of said surface upon which said object is placed;
illuminating said object by means of a non-diffuse light source placed at a known second location spaced away from said side of said surface upon which said object is placed;
imaging that side of said translucent surface opposite to said side upon which said object is placed by means of imaging means for generating signals representative of illuminated and shadowed portions of said opposite side of said surface; and
calculating the position of at least one portion of said object by processing at least said signals representative of illuminated and shadowed portions of said opposite side of said surface.

14. A method according to claim 13, further comprising the step of storing at least said signals representative of illuminated and shadowed portions generated during said step of illuminating said object by means of a light source placed at said first location.

15. A method according to claim 14 further comprising the step of taking the difference between said signals representative of illuminated and shadowed portions generated during said steps of illuminating.

16. A method according to claim 13 further comprising the step of performing said steps of illumination in time sequence.

17. A method according to claim 13 further comprising the step of illuminating said object by diffuse light to thereby project an outline image to said other side of said translucent surface.

* * * * *

UNITED STATES PATENT AND TRADEMARK OFFICE
CERTIFICATE OF CORRECTION

PATENT NO. : 5,013,927
DATED : May 7, 1991
INVENTOR(S) : Constantine J. Tsikos & Jerome P. Rosenfeld It is certified that error appears in the above-identified patent and that said Letters Patent is hereby corrected as shown below:

On the title page, item [21] Appl. No.: "515,834" should read as --515,894--.

Signed and Sealed this

Thirteenth Day of April, 1993

Attest:

STEPHEN G. KUNIN

Attesting Officer

Acting Commissioner of Patents and Trademarks